G. L. LEWIS.
DEVICE FOR BREAKING, CONTRACTING, AND EXPANDING RIMS.
APPLICATION FILED JAN. 20, 1919.
1,305,654. Patented June 3, 1919.
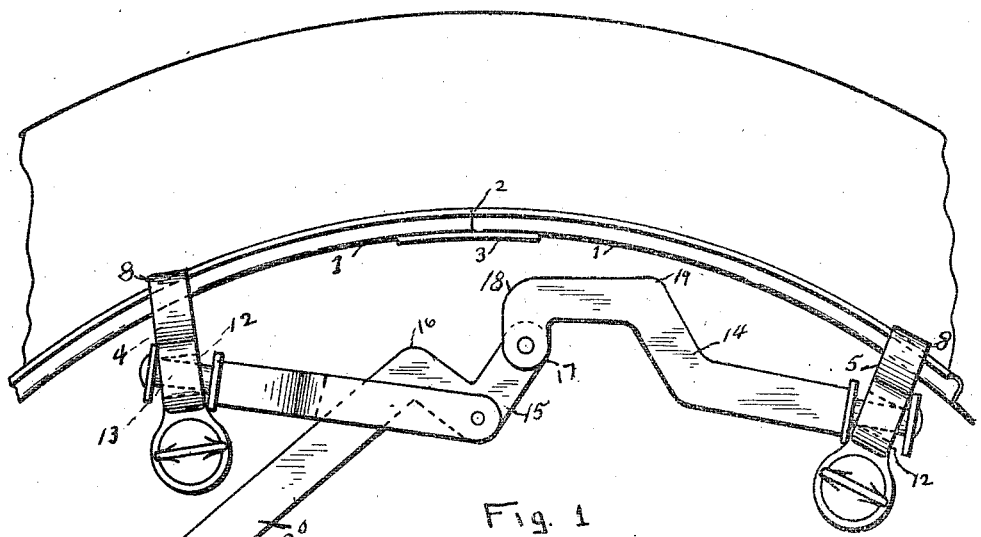
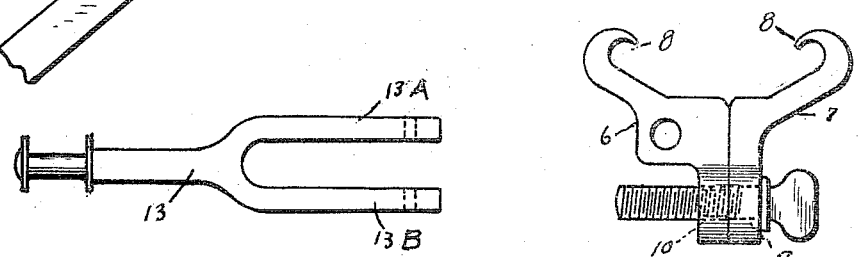
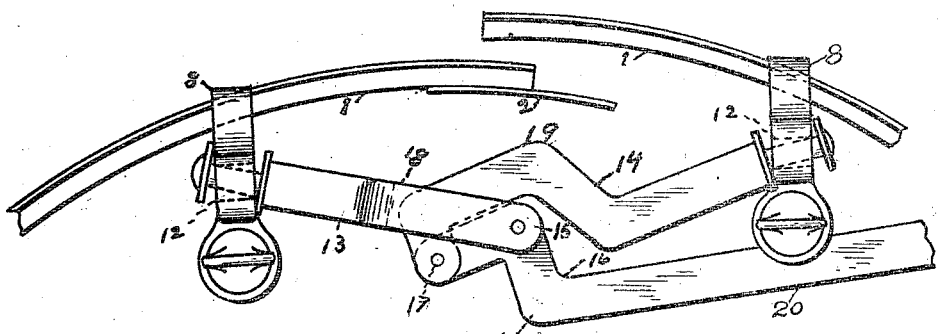
Witnesses
Inventor
Guy L. Lewis

UNITED STATES PATENT OFFICE.

GUY L. LEWIS, OF AKRON, OHIO.

DEVICE FOR BREAKING, CONTRACTING, AND EXPANDING RIMS.

1,305,654.  Specification of Letters Patent.  Patented June 3, 1919.

Application filed January 20, 1919. Serial No. 272,169.

*To all whom it may concern:*

Be it known that I, GUY L. LEWIS, a citizen of the United States, and a resident of Akron, in the county of Summit and State of Ohio, have invented certain new and useful Improvements in the Devices for Breaking, Contracting, and Expanding Rims; and I hereby declare the following to be a full, clear, and concise description of the invention, such as will enable others skilled in the art to which it appertains to make and use the same.

This invention relates to new and useful improvements in tools, for breaking the joint in demountable rims and contracting the rim when it is desired to remove the tire therefrom and holding the same in open position while the tire is removed and replaced, and thereafter expanding the rim to its original position. A further object of this invention is to provide a tool of this character which will be of simple and durable construction, inexpensive to manufacture and very efficient in operation. With these and other objects in view, the invention consists of certain novel features of construction and combination of parts, more fully hereinafter pointed out and referred to in the specification and claim.

Referring to the accompanying drawings forming a part of this specification in which like numerals designate the same parts in all the views:

Figure 1 is a side elevational view of the improved tool showing it applied to a demountable rim for the purpose of breaking the joint and contracting same.

Fig. 2 is a view similar to that shown in Fig. 1, but showing the rim after the joint has been broken and after the rim has been contracted and showing the position assumed by the different parts of the tool when the operation is completed.

Fig. 3 is a view of one set of clamps or gripping members.

Fig. 4 is a view of the small connecting arm showing the forked construction.

The numeral 1 indicates a portion of the ordinary type of demountable rim showing the same with the joint thereof at 2, the two ends being locked together by the usual means as shown at 3. Connected to the two ends of the rim 1, and adjacent to the joint 2 are a pair of clamps or gripping members 4 and 5, and as they are substantially alike I will describe one of them.

Each set of clamps or gripping members consist of two parts or sections 6 and 7, the inner surface of which conforms to the contour of the rim and the ends of which extend around the sides and under the rim as shown at 8. The upper ends of said clamp sections are squared and have a hole drilled through as at 9, one end of which is threaded as at 10, into which hole a thumb screw 11, is inserted by means of which the clamping member is adjusted to the rim.

To one side of the center of the clamp another hole is drilled as at 12, and into this one end of the connecting arm 13 is loosely swiveled and into the other clamp one end of the connecting arm 14.

The connecting arm 13 consists of a straight bar swiveled to the clamp at one end, the other end of which is of forked construction as shown by 13$^A$ and 13$^B$, the two sides of which are pivoted to the handle 20 at a point where there is a set off in the handle as shown at 15, the sides of the fork 13$^A$ and 13$^B$ being of sufficient length to allow the set off in the handle from 15 to 16 to pass between the same. The other connecting arm is a straight bar swiveled to the clamp at one end and pivoted to the end of the handle 20 as shown at 17 and containing a set off as shown from 18 to 19 of the same size as the set off in the handle from 15 to 17.

When the above described tool is in operation the device is applied to the rim as shown in Fig. 1 of the drawings, and when it is desired to part the rim at the joint of the same, the operating handle 20 is drawn to the position shown in Fig. 2. When in this position it will be noted that the set offs in the handle and in the connecting arms fit into each other, and since it has been drawn past the center the same will be automatically locked. It will also be noted that the ends of the rim will be broken and positioned one above the other. It will be noted that the clamps are swiveled to the connecting arms to the side of the center of the clamps; when the tension is applied they will tend to bind on the rim and will draw tighter as pressure is applied thus eliminating all possibility of the clamps slipping on the rim. It will be further noted that the clamps being loosely swiveled to the connecting arms can be readily adjusted to the rim in a position slightly on an angle so that when the rim is again expanded, it will expand one-fourth of an inch farther than its natural position so that the same can be readily locked into the position required for running.

This is obviously an improvement over other devices of this character. It is obvious that various changes in form, proportion and in the minor details of construction may be made without departing from the spirit of this invention, and I do not wish to be limited to the above exposure except as may be required by the claim.

What I claim as new and desire to secure Letters Patent upon is:

In a rim breaker, the combination of clamps for gripping each end of the rim, one jaw of each clamp having a perforation to one side of the normal center of the clamp when in operation, an arm loosely swiveled at one end in the perforation of one of said clamps permitting the clamp to tilt transversely to the rim and having at its opposite end a rectangular offset with its end bent back in line with said arm, a second arm swiveled at one end in the perforation of the other clamp and having at its opposite end a yoke, a lever having a rectangular offset the end of which is pivoted to the bent back end of the first arm, the yoke of the second arm being pivoted at the offset angle of the lever.

GUY L. LEWIS.

Witnesses:
FRANK A. RUTTMAN,
ESTHER L. SUBRIN.